United States Patent
Hirano

(10) Patent No.: US 11,114,116 B2
(45) Date of Patent: Sep. 7, 2021

(54) INFORMATION PROCESSING APPARATUS AND INFORMATION PROCESSING METHOD

(71) Applicant: SONY CORPORATION, Tokyo (JP)

(72) Inventor: Yuya Hirano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 32 days.

(21) Appl. No.: 16/334,263

(22) PCT Filed: Sep. 25, 2017

(86) PCT No.: PCT/JP2017/034576
§ 371 (c)(1),
(2) Date: Mar. 18, 2019

(87) PCT Pub. No.: WO2018/092420
PCT Pub. Date: May 24, 2018

(65) Prior Publication Data
US 2019/0304485 A1 Oct. 3, 2019

(30) Foreign Application Priority Data
Nov. 16, 2016 (JP) ................................. 2016-223114

(51) Int. Cl.
| | | |
|---|---|---|
| G10L 25/78 | (2013.01) | |
| G06F 3/01 | (2006.01) | |
| G06F 21/62 | (2013.01) | |
| G10L 15/08 | (2006.01) | |
| G10L 15/22 | (2006.01) | |
| H04M 1/00 | (2006.01) | |

(52) U.S. Cl.
CPC .............. *G10L 25/78* (2013.01); *G06F 3/016* (2013.01); *G06F 21/62* (2013.01); *G06F 21/629* (2013.01); *G10L 15/08* (2013.01); *G10L 15/22* (2013.01); *H04M 1/00* (2013.01); *G10L 2025/783* (2013.01)

(58) Field of Classification Search
USPC .......................... 704/200, 246, 247, 251, 252
See application file for complete search history.

(56) References Cited

U.S. PATENT DOCUMENTS

| | | | |
|---|---|---|---|
| 10,542,423 B1 * | 1/2020 | Chang | .................. H04W 4/023 |
| 2011/0096939 A1 | 4/2011 | Ichimura | |

(Continued)

FOREIGN PATENT DOCUMENTS

| | | |
|---|---|---|
| AU | 2013371346 A1 | 7/2015 |
| CA | 2895265 A1 | 7/2014 |

(Continued)

OTHER PUBLICATIONS

International Search Report and Written Opinion of PCT Application No. PCT/JP2017/034576, dated Nov. 28, 2017, 11 pages of ISRWO.

*Primary Examiner* — Leonard Saint Cyr
(74) *Attorney, Agent, or Firm* — Chip Law Group

(57) ABSTRACT

To provide an information processing apparatus, an information processing method, and a program capable of specifying the privacy risk for a user. The information processing apparatus includes a privacy risk specification unit that specifies privacy risk information indicating a privacy risk for a user on the basis of action information indicating an action state of the user.

16 Claims, 9 Drawing Sheets

(56) References Cited

U.S. PATENT DOCUMENTS

| | | | |
|---|---|---|---|
| 2013/0340086 A1* | 12/2013 | Blom | G06F 21/6245 |
| | | | 726/26 |
| 2014/0181715 A1 | 6/2014 | Axelrod et al. | |
| 2014/0189784 A1 | 7/2014 | Marino et al. | |
| 2016/0226917 A1* | 8/2016 | Plagemann | H04L 63/101 |
| 2016/0330160 A1* | 11/2016 | Shan | H04L 65/4076 |
| 2017/0083282 A1 | 3/2017 | Tsunoda | |
| 2017/0169242 A1* | 6/2017 | Yu | G06F 21/6218 |

FOREIGN PATENT DOCUMENTS

| | | |
|---|---|---|
| CN | 102056036 A | 5/2011 |
| JP | 2008-160506 A | 7/2008 |
| JP | 2010-021627 A | 1/2010 |
| JP | 2011-097268 A | 5/2011 |
| JP | 2016-503208 A | 2/2016 |
| WO | 2008/099486 A1 | 8/2008 |
| WO | 2014/105934 A1 | 7/2014 |
| WO | 2014/107435 A1 | 7/2014 |
| WO | 2015/186387 A1 | 12/2015 |

\* cited by examiner

FIG. 5

| MOVEMENT STATE | UTTERANCE STATE | AREA | NOISE CLASS | PRIVACY RISK LEVEL |
|---|---|---|---|---|
| CYCLING | — | — | — | 1 |
| JOGGING | | | | |
| WALKING | SPEAKING | — | — | 4 |
| | NOT-SPEAKING | HOME | — | 1 |
| | | WORKPLACE | — | 3 |
| | | OTHER | PINK NOISE TYPE | 2 |
| | | | BUBBLE NOISE TYPE | 3 |
| | | | WHITE NOISE TYPE | 3 |
| STILLNESS | SPEAKING | — | — | 4 |
| | NOT-SPEAKING | HOME | — | 1 |
| | | WORKPLACE | — | 3 |
| | | OTHER | | |

FIG. 6

| PRIVACY LEVEL | CONTENT EXAMPLES |
|---|---|
| HIGH | EMAIL<br>SOCIAL MEDIA INFORMATION<br>INCOMING CALL INFORMATION (NAME OF CALLER) |
| MEDIUM | AMOUNT OF ACTIVITY<br>NEWS BASED ON USER'S INTERESTS |
| LOW | WEATHER<br>TOP NEWS<br>MUSIC |

FIG. 7

| PRIVACY RISK LEVEL | OUTPUT RULE EXAMPLES |
|---|---|
| 1 | OUTPUT ALL CONTENT. |
| 2 | OUTPUT ONLY CONTENT WITH "LOW", "MEDIUM" PRIVACY LEVEL. |
| 3 | OUTPUT ONLY CONTENT WITH "LOW" PRIVACY LEVEL. |
| 4 | DO NOT OUTPUT CONTENT. |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/034576 filed on Sep. 25, 2017, which claims priority benefit of Japanese Patent Application No. JP 2016-223114 filed in the Japan Patent Office on Nov. 16, 2016. Each of the above-referenced applications is hereby incorporated herein by reference in its entirety.

TECHNICAL FIELD

The present disclosure relates to an information processing apparatus, an information processing method, and a program.

BACKGROUND ART

Technology for suppressing sound leakage from headphones, earphones, and the like is known. For example, Patent Literature 1 discloses recording ambient sound on the outside of a housing to evaluate sound leakage and suppressing the leakage of sound outside the housing on the basis of the sound leakage evaluation result.

On the other hand, devices including what is called a push output function that outputs (presents) content irrespectively of active operations by the user are being used widely. There is a variety of pushed content, but in many cases, content including a user's personal information, such as information about received emails and phone calls, notifications related to social media, and the like, for example, is output irrespectively of active operations by the user.

CITATION LIST

Patent Literature

Patent Literature 1: JP 2008-160506A

DISCLOSURE OF INVENTION

Technical Problem

However, for example, in the case in which push output is executed by a display that is also visible to persons other than the user who is the target of information presentation, by a speaker that outputs sound that is also hearable by persons other than the user, or the like, there is a risk of user privacy being infringed. To protect the privacy of a user, it is desirable to grasp the risk of the user's privacy being infringed in the situation in which the user is placed (hereinafter called the privacy risk for a user or simply the privacy risk in some cases).

Accordingly, the present disclosure proposes a novel and improved information processing apparatus, information processing method, and program capable of specifying the privacy risk for a user.

Solution to Problem

According to the present disclosure, there is provided an information processing apparatus including: a privacy risk specification unit configured to specify privacy risk information indicating a privacy risk for a user on the basis of action information indicating an action state of the user.

In addition, according to the present disclosure, there is provided an information processing method, executed by a processor, including: specifying privacy risk information indicating a privacy risk for a user on the basis of action information indicating an action state of the user.

In addition, according to the present disclosure, there is provided a program causing a computer to realize: a function of specifying privacy risk information indicating a privacy risk for a user on the basis of action information indicating an action state of the user.

Advantageous Effects of Invention

According to the present disclosure as described above, it is possible to specify the privacy risk for a user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a table illustrating one example of a privacy risk level specification method by a privacy risk specification unit 116 according to the embodiment.

FIG. 6 is a table illustrating one example of privacy levels and content corresponding to privacy levels according to the embodiment.

FIG. 7 is a table illustrating one example of output rules corresponding to privacy risk levels according to the embodiment.

MODE(S) FOR CARRYING OUT THE INVENTION

Figure 1:
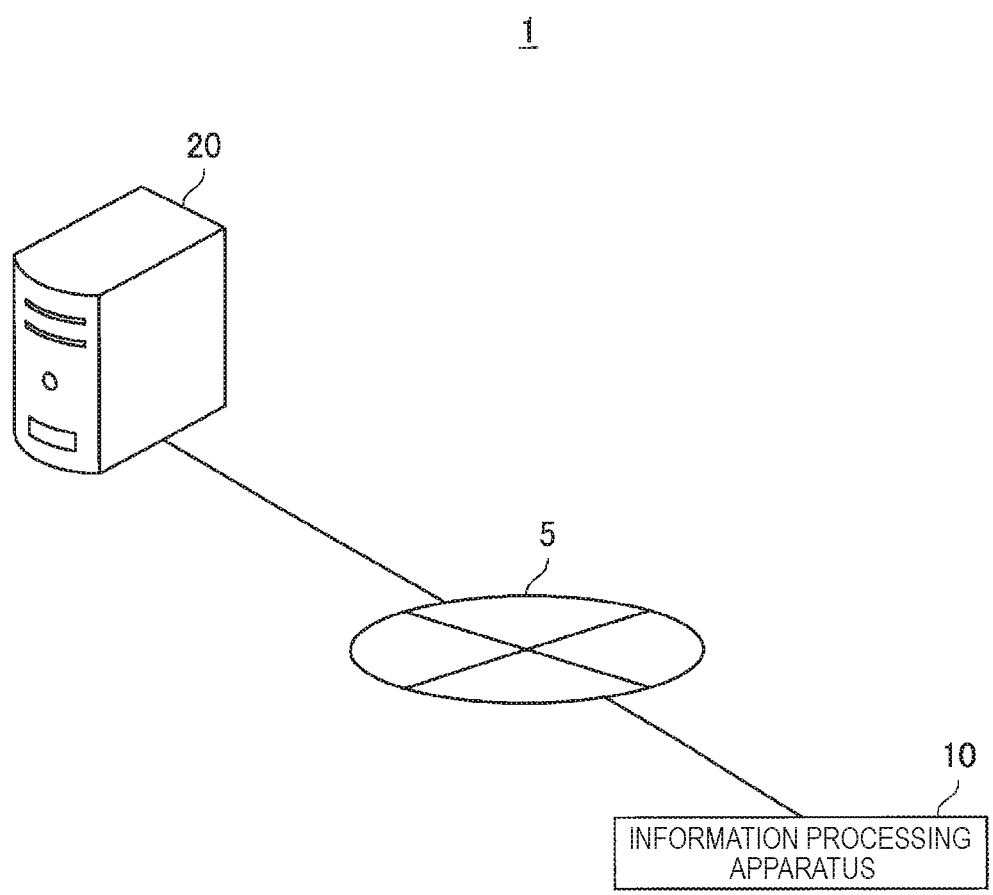
FIG. 1 is an explanatory diagram illustrating a configuration of an information processing system including an information processing apparatus according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, elements that have substantially the same function and structure are sometimes distinguished from each other using different alphabets after the same reference sign. However, when there is no need in particular to distinguish elements that have substantially the same function and structure, the same reference sign alone is attached.

Hereinafter, the description will proceed in the following order.

<<1. Overview>>
<<2. Functional configuration>>
<2-1. Overall configuration>
<2-2. Details about control unit>
<<3. Operations>>
<<4. Modifications>>
<4-1. Modification 1>
<4-2. Modification 2>
<4-3. Modification 3>
<4-4. Modification 4>
<4-5. Modification 5>
   <<5. Exemplary hardware configuration>>
   <<6. Conclusion>>

1. OVERVIEW

First, an overview of one embodiment of the present disclosure will be described with reference to the drawings. FIG. 1 is an explanatory diagram illustrating a configuration of an information processing system including an information processing apparatus according to one embodiment of the present disclosure.

As illustrated in FIG. 1, the information processing system 1 according to one embodiment of the present disclosure includes a communication network 5, an information processing apparatus 10, and a server 20. Also, the information processing system 1 outputs (provides) content to a user of the information processing apparatus 10.

The communication network 5 is a wired or wireless transmission path for information transmitted from an apparatus connected to the communication network 5. For example, the communication network 5 may include a public network such as the Internet, a telephone network, or a satellite communication network, various local area networks (LANs) including Ethernet (registered trademark), a wide area network (WAN), and the like. Additionally, the communication network 5 may also include a dedicated network such as an Internet Protocol virtual private network (IP-VPN). As illustrated in FIG. 1, the information processing apparatus 10 and the server 20 are interconnected through the communication network 5.

The information processing apparatus 10 outputs various content to the user. The content output by the information processing apparatus 10 may be acquired from the server 20 illustrated in FIG. 1 through the communication network 5, or stored in a storage unit provided in the information processing apparatus 10. Additionally, the information processing apparatus 10 may also acquire content including text information, and output the content by reading the text information aloud by speech synthesis technology.

The server 20 is an information processing apparatus that provides content to the information processing apparatus 10. For example, the server 20 may not only provide content to the information processing apparatus 10 in response to a request from the information processing apparatus 10, but also provide content to the information processing apparatus 10 irrespectively of a request from the information processing apparatus 10. According to such a configuration, the information processing apparatus 10 becomes able to output what is called push content, irrespectively of active operations by the user.

Figure 2:
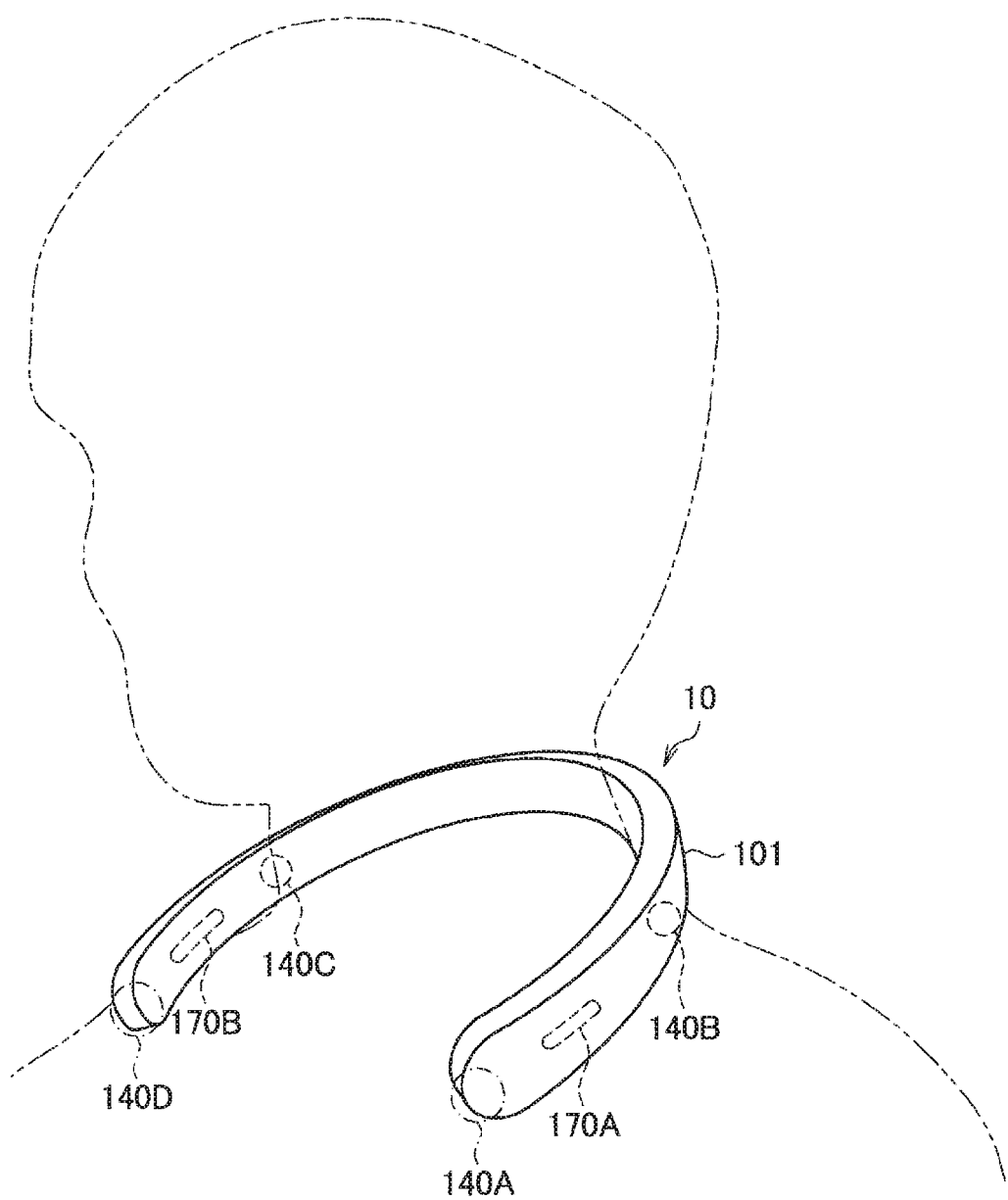
FIG. 2 is an explanatory diagram for explaining one example of a schematic configuration of the information processing apparatus 10 according to the embodiment.

FIG. 2 is an explanatory diagram for explaining an example of a schematic configuration of the information processing apparatus 10 according to the present embodiment. FIG. 2 illustrates an example in which the information processing apparatus 10 is a neckband-style wearable device worn by the user. More specifically, the information processing apparatus 10 is formed in the shape of a ring with an open part (in other words, a cashew shape or a U shape), and is worn by the user such that at least a part of the inner face of the ring portion abuts a part of the user's neck (that is, hangs on the neck).

Also, the information processing apparatus 10 is provided with a sound collection unit (such as a microphone, for example) and collects ambient sound, which may include speech uttered by the user, from the sound collection unit as a sound signal (sound information). For example, in the example illustrated in FIG. 2, the information processing apparatus 10 is provided with multiple sound collection units 140A to 140D. More specifically, the sound collection units 140A to 140D are supported by a housing 101 of the information processing apparatus 10, for example.

Also, the information processing apparatus 10 is provided with a sound output unit (such as a speaker, for example) and outputs sound based on content (for example, the speech of content read aloud by speech synthesis) from the sound output unit. For example, in the example illustrated in FIG. 2, the information processing apparatus 10 is provided with two sound output units 170A and 170B, and sound output from the sound output units 170A and 170B may also be heard by persons other than the user. More specifically, the sound output units 170A and 170B are open speakers, and are supported by the housing 101 of the information processing apparatus 10, for example.

Note that FIG. 2 is one example, and the numbers of the sound collection unit and the sound output unit provided in the information processing apparatus 10 are not limited to the example illustrated in FIG. 2. Also, the positions where the sound collection unit and the sound output unit are provided are not limited to the example illustrated in FIG. 2. In addition, the sound collection unit and the sound output unit may also be devices separate from the information processing apparatus 10.

As illustrated in FIG. 2, for the information processing apparatus 10 that is a portable wearable device carried by the user, there is a wide variety of usage scenes, such as at home, in an office, outdoors, and the like, for example, and situations in which the environment around the information processing apparatus 10 changes dynamically are anticipated. Also, in the case in which the output unit provided in the information processing apparatus 10 is an open speaker like the sound output units 170A and 170B illustrated in FIG. 2 for example, depending on the surrounding environment, content output from the information processing apparatus 10 may be perceived by persons other than the user.

Consequently, in the case in which the content output from the information processing apparatus 10 includes the user's personal information, depending on the surrounding environment, there is a risk of user privacy being infringed. For example, in the case in which push content is output without an operation by the user, since content is output irrespectively of the user's intentions, there is a risk that the user's personal information may be perceived by someone other than the user.

Accordingly, focusing on the above circumstances led to the creation of the present embodiment. According to the present embodiment, by specifying a privacy risk for a user and controlling output on the basis of the privacy risk, it is possible to reduce the infringement of user privacy. Hereinafter, a configuration and operations according to the present embodiment having such advantageous effects will be described successively in detail.

2. FUNCTIONAL CONFIGURATION

Figure 3:
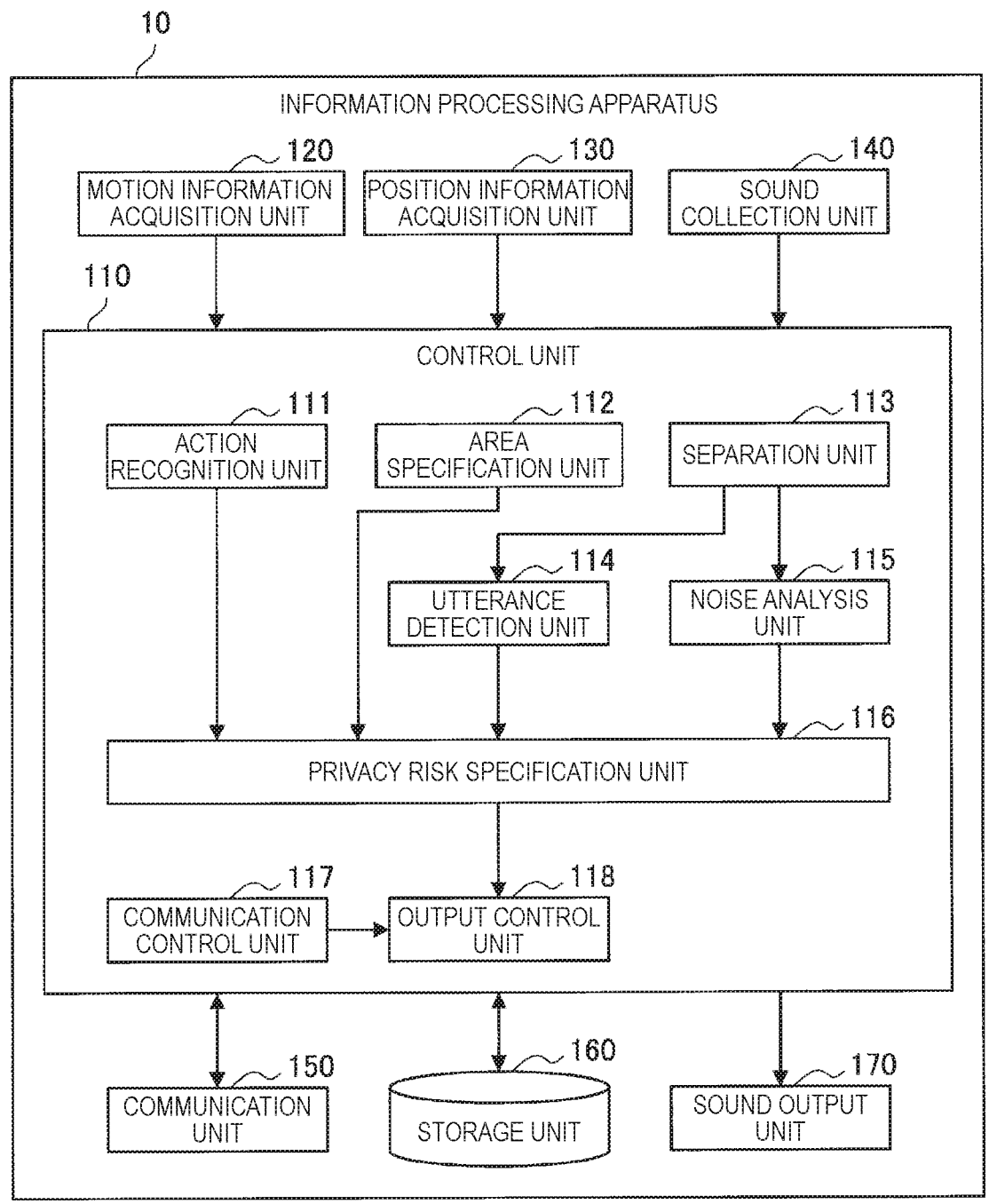
FIG. 3 is a block diagram illustrating one example of a functional configuration of the information processing apparatus 10 according to the embodiment.

FIG. 3 is a block diagram illustrating one example of a functional configuration of the information processing apparatus 10 according to one embodiment of the present disclosure. As illustrated in FIG. 3, the information processing apparatus 10 according to the present embodiment is provided with a control unit 110, a motion information acquisition unit 120, a position information acquisition unit 130, a sound collection unit 140, a communication unit 150, a storage unit 160, and a sound output unit 170. In the following, after describing an overall configuration of the information processing apparatus 10, the control unit 110 will be described in detail.

<2-1. Overall Configuration>

The control unit 110 controls each component of the information processing apparatus 10 and causes various applications to be executed. Also, the control unit 110 acquires action information indicating an action state of the user on the basis of motion information related to user motion input from the motion information acquisition unit 120 and a sound signal input from the sound collection unit 140. The action information will be described later, but the action information may include movement information indicating a movement state and information indicating an utterance state of the user, for example.

In addition, the control unit 110 acquires environment information related to the environment around the user on the basis of position information input from the position information acquisition unit 130 and a sound signal input from the sound collection unit 140. The environment information will be described later, but the environment information may include area information indicating an area where the user is positioned and information related to noise around the user, for example.

Additionally, the control unit 110 specifies privacy risk information indicating the privacy risk for the user on the basis of the action information and the environment information described above, and controls sound output by the sound output unit 170 described later on the basis of the privacy risk information. Details about the control unit 110 will be described later.

The motion information acquisition unit 120 acquires motion information related to the motion of the user according to the information processing apparatus 10 by sensing. The motion information acquisition unit 120 may include motion sensors such as an acceleration sensor, a gyro sensor, and a geomagnetic sensor, for example, and the motion information may include information such as acceleration, angular acceleration, and direction.

The position information acquisition unit 130 acquires position information indicating the position of the information processing apparatus 10. Note that since the present embodiment assumes that the information processing apparatus 10 is being carried by the user, the position information of the information processing apparatus 10 acquired by the position information acquisition unit 130 is also treated as position information of the user.

For example, the position information acquisition unit 130 may include a global navigation satellite system (GNSS) receiver and/or a communication device or the like. The GNSS may include, for example, the Global Positioning System (GPS), the Global Navigation Satellite System (GLONASS), the BeiDou Navigation Satellite System (BDS), the Quasi-Zenith Satellites System (QZSS), or Galileo and the like. Also, the communication device acquires position information by utilizing technology such as Wi-fi, multi-input multi-output (MIMO), cellular communication (for example, position detection using mobile base stations or a femtocell), or short-range wireless communication (for example, Bluetooth Low Energy (BLE) or Bluetooth (registered trademark)), for example.

The sound collection unit 140 is a sound collection device for collecting the sound of the external environment (that is, sound that arrives by propagating through the external environment), like a microphone, for example. Note that speech input from the user is also acquired by the information processing apparatus 10 by being collected by the sound collection unit 140. In addition, as illustrated in FIG. 2, the sound collection unit 140 according to the present embodiment may include multiple sound collection devices. The sound collection unit 140 outputs a sound signal based on the result of collecting the sound of the external environment to the control unit 110. Note that the sound signal output from the sound collection unit 140 may also be, for example, gain-adjusted by an amp or the like and converted from an analog signal to a digital signal by AD conversion before being input into the control unit 110.

The communication unit 150 communicates information with other devices. By having the communication unit 150 communicate information with other devices, content may be received from the server 20 illustrated in FIG. 1, for example.

The storage unit 160 stores programs and parameters by which each component of the information processing apparatus 10 functions. In addition, the storage unit 160 may also store content data.

The sound output unit 170 outputs sound in accordance with control by the control unit 110. As illustrated in FIG. 2 for example, the sound output unit 170 may be open speakers.

<2-2. Details about Control Unit>

The above describes an exemplary overall functional configuration of the information processing apparatus 10 according to the present embodiment. Next, the functional configuration of the control unit 110 illustrated in FIG. 3 will be described in greater detail. As illustrated in FIG. 3, the control unit 110 also functions as an action recognition unit 111, an area specification unit 112, a separation unit 113, an utterance detection unit 114, a noise analysis unit 115, a privacy risk specification unit 116, a communication control unit 117, and an output control unit 118.

The action recognition unit 111 executes action recognition on the basis of motion information related to user motion input from the motion information acquisition unit 120. Since methods of action recognition are described in numerous literature, a detailed description is omitted here. In the present embodiment, the action recognition unit 111 is able to adopt any configuration of known action recognition technology.

There are various types of actions (action recognition results) recognized by the action recognition executed by the action recognition unit 111, but movement information indicating the movement state of the user may be acquired by the action recognition, for example. Note that the following describes an example in which movement information indicating a movement state from among cycling, jogging, walking, and stillness is acquired by the action recognition executed by the action recognition unit 111. Also, the movement information acquired by the action recognition unit 111 is input into the privacy risk specification unit 116.

The area specification unit 112 specifies an area where the user is positioned on the basis of position information input from the position information acquisition unit 130, and acquires area information indicating the area. For example, the area specification unit 112 may determine whether or not the user is positioned inside a geofence set as a virtual boundary for an area in the real world, and specify the area where the user is positioned. The following describes an example in which a geofence is set as the virtual boundary of a home or a workplace, and the area specification unit 112 specifies home, workplace, or other (outside the geofences of the home and the workplace) as the area where the user is positioned. Also, the area information acquired by the area specification unit is input into the privacy risk specification unit 116.

Note that an area such as the home or the workplace may be preset by the user or estimated automatically on the basis of a history of position information or the like, for example. For example, it is possible to treat a location where the user stays for a long period of time as a stay point, and on the additional basis of information such as the time of day when the user stays, estimate a predetermined radius centered on the stay point as an area such as the home, the workplace, or the like.

The separation unit 113 separates a sound signal input from the multiple sound collection units 140 into a speech signal related to user speech and a noise signal related to ambient noise. The separation unit 113 may acquire a sound signal based on sound collected from the direction of the user on the basis of a beamforming method for example as the speech signal, and acquire a sound signal based on sound collected from directions other than the user as the noise signal. The acquired speech signal is input into the utterance detection unit 114, and the noise signal is input into the noise analysis unit 115.

The utterance detection unit 114 detects an utterance by the user on the basis of the speech signal input from the separation unit 113, and acquires information indicating an utterance state of the user. For example, the utterance state of the user may be either speaking or not-speaking. Information indicating the acquired utterance state (one example of action information) is input into the privacy risk specification unit 116. Note that the information processing apparatus 10 may also include a function of recognizing the content of an utterance in the case in which an utterance is detected by the utterance detection unit 114.

The noise analysis unit 115 analyzes the noise signal input from the separation unit 113, and acquires information related to noise. For example, the noise analysis unit 115 may specify a class of noise (noise class) included in the noise signal according to a frequency component analysis of the noise signal, and acquire information indicating the noise class as the information related to noise.

Figure 4:
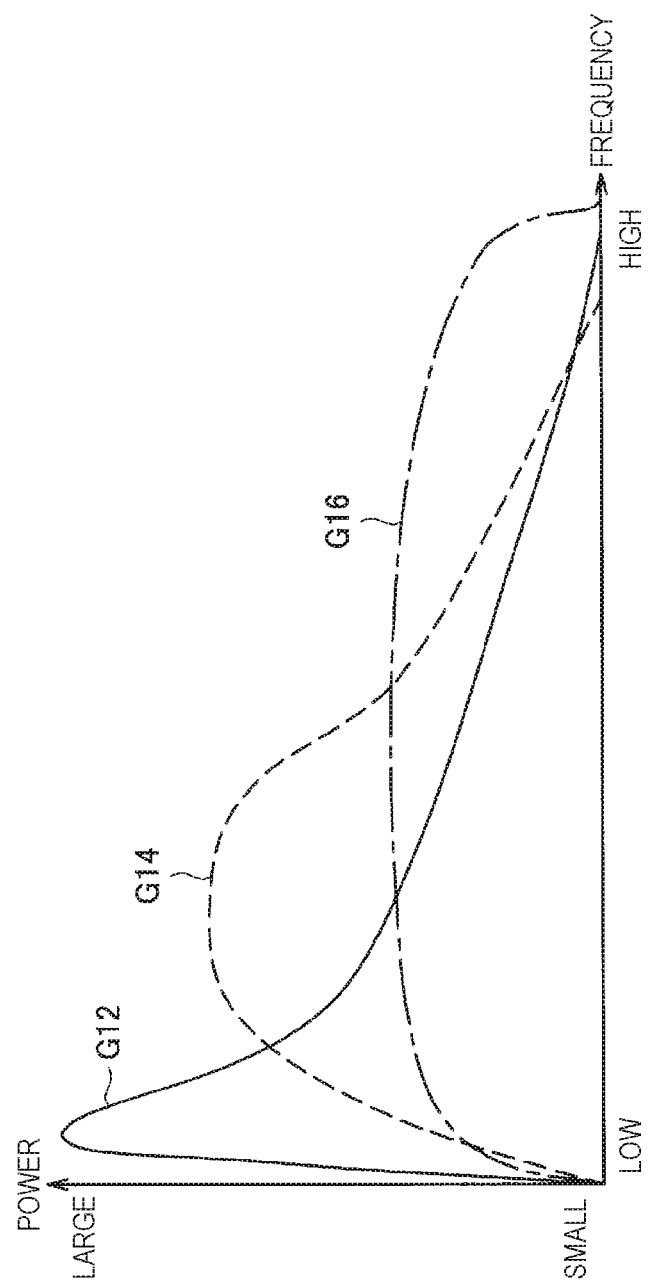
FIG. 4 is an explanatory diagram for explaining noise classes according to the embodiment.

FIG. 4 is an explanatory diagram for explaining noise classes. In FIG. 4, a noise signal G12 of the pink noise type, a noise signal G14 of the bubble noise type, and a noise signal G16 of the white noise type are illustrated as one example of noise classified into respective noise classes.

The noise signal G12 of the pink noise type is powerful in the low range, and tends to occur outdoors where traveling vehicles are present nearby, such as a road or by a railway, for example. Consequently, in the case in which a noise signal of the pink noise type is acquired, the privacy risk is considered to be low.

The noise signal G14 of the bubble noise type is powerful in the midrange, and tends to occur in environments where people are making conversation (utterances), such as in a train station (past the ticket gate, on the platform, or the like), outside such as downtown or in a crowd, or in an indoor facility such as a cafe. Consequently, in the case in which a noise signal of the bubble noise type is acquired, there is a high probability of other persons being present nearby, and the privacy risk is considered to be high.

The noise signal G16 of the white noise type has power over a wide frequency band from the low range to the high range, and tends to occur inside an office or at home, for example. In an office, since persons other than the user may hear sound output from the information processing apparatus 10, the privacy risk is considered to be high. On the other hand, at home, since there is a high probability that only the user or persons that the user trusts (for example, family) are present, the privacy risk is considered to be low. Consequently, in the case in which a noise signal of the white noise type is acquired, it is desirable to specify the privacy risk in combination with information other than the noise class information.

For example, the noise analysis unit 115 may specify the noise class by comparing the average power value for each frequency according to the noise signal to a predetermined threshold value. For example, in the case in which the average power value for each frequency according to the noise signal is smaller than the predetermined threshold value, the pink noise type may be specified as the noise class of the noise signal.

Also, the noise class information specified by the noise analysis unit 115 (one example of information related to noise) is input into the privacy risk specification unit 116.

The privacy risk specification unit 116 illustrated in FIG. 3 evaluates the privacy risk on the basis of the action information (movement information, information indicating the utterance state) and the environment information (area information, information related to noise), and specifies privacy risk information indicating the privacy risk.

For example, in the case in which the user's movement speed is high, there is a high probability that the relative speed between the user and persons other than the user is also high, and the probability that the output of the information processing apparatus 10 will be perceived by a person other than the user is considered to be low. For this reason, the privacy risk specification unit 116 may specify the privacy risk information such that the privacy risk becomes lower as the movement information indicates a movement state with a greater movement speed. For example, for the movement states described above, the movement states in order of greatest movement speed are cycling, jogging, walking, and stillness.

Also, in the case in which the user is speaking, the probability that a conversation partner of the user is present near the user is considered to be high. For this reason, the privacy risk specification unit 116 may specify the privacy risk information such that the privacy risk in the case of the "speaking" utterance state becomes higher than in the case of the "not-speaking" utterance state.

Also, in the case in which the user is positioned at home, since the probability that only the user or persons that the user trusts (for example, family) are present nearby is considered to be high, the privacy risk is considered to be low. For this reason, the privacy risk specification unit 116 may specify the privacy risk information such that the privacy risk in the case in which the area where the user is positioned is the home becomes higher than in the case in which the area where the user is positioned is the workplace or an other area.

Also, as described above, in the case in which a noise signal of the pink noise type is acquired, the privacy risk is considered to be low. For this reason, the privacy risk specification unit 116 may specify the privacy risk information such that the privacy risk in the case of acquiring a noise signal of the pink noise type becomes lower than in the case of acquiring a noise signal of a different noise class.

Note that in although the above describes an example in which noise class information is used as the information related to noise, but the information related to noise may also include information such as the magnitude of the noise (for example, the sound pressure level according to the noise signal). It is thought that as the ambient noise becomes greater, the information output from the information processing apparatus 10 is more likely to be recognized by persons other than the user. For this reason, the privacy risk specification unit 116 may specify the privacy risk information such that the privacy risk becomes lower as the magnitude of the noise becomes greater.

The privacy risk information specified by the privacy risk specification unit 116 may also be a privacy risk level that quantifies the privacy risk, for example. In the following, the privacy risk level specified by the privacy risk specification unit 116 will be described as being a value from 1 to 4, such that the higher the privacy risk, the larger the value of the privacy risk level.

Additionally, the privacy risk specification unit 116 may also specify the privacy risk level on the basis of the action information and the environment information according to the combination of the four items of the action state, the utterance state, the area, and the noise class. FIG. 5 is a table illustrating one example of a privacy risk level specification method by the privacy risk specification unit 116. In the table illustrated in FIG. 5, "-" means that the privacy risk level is specified without depending on that item.

Note that the privacy risk level specification method illustrated in FIG. 5 is one example, and the privacy risk level specification method by the privacy risk specification unit 116 is not limited to such an example. For example, the privacy risk specification unit 116 may specify a score for each item illustrated in FIG. 5, and specify the privacy risk level on the basis of the total score value.

The communication control unit 117 illustrated in FIG. 3 controls communication by the communication unit 150. For example, under control by the communication control unit 117, the communication unit 150 is able to receive content from the server 20 illustrated in FIG. 1.

The output control unit 118 controls the sound output by the sound output unit 170 on the basis of the privacy risk information specified by the privacy risk specification unit 116. For example, the output control unit 118 may cause content acquired from the server 20 through the communication unit 150 or content stored in the storage unit 160 to be output according to processes related to an application executed by the control unit 110. Also, in the case in which the content includes text information, the output control unit 118 may convert the text information into a speech signal by speech synthesis technology, and cause the sound output unit 170 to output sound (read aloud).

For example, the output control unit 118 may control content-related output on the basis of the privacy level of the information included in the content. The privacy level of information included in the content may be associated with the content and provided by the server 20 or the storage unit 160, for example. FIG. 6 is a table illustrating one example of privacy levels and content corresponding to privacy levels. As illustrated in FIG. 6, in the present embodiment, the privacy level may be one of "high", "medium", and "low", for example.

Note that the above describes an example in which the privacy level of information included in content is provided in association with the content, but the present technology is not limited to such an example. For example, the privacy level of information included in content may also be specified according to metadata such as a content category associated with the content, or specified by analysis of the content.

For example, the output control unit 118 may cause content to be output in accordance with privacy-related output rules corresponding to the privacy risk level (one example of privacy risk information). FIG. 7 is a table illustrating one example of output rules corresponding to privacy risk levels. The output control unit 118 determines whether or not content is outputtable in accordance with the privacy level of the content and the output rules illustrated in FIG. 7, and if outputtable, causes the content to be output. In the example illustrated in FIG. 7, the output of content may be controlled such that as the privacy risk level becomes higher (greater), information with a high privacy level is not output.

The above describes an exemplary functional configuration of the information processing apparatus 10 according to the present embodiment. Note that the functional configuration of the information processing apparatus 10 illustrated in FIG. 3 is one example, and the present embodiment is not limited thereto. For example, the information processing apparatus 10 may also be provided with a biological sensor, a barometric pressure sensor, a human presence sensor, a camera, a depth camera, and the like to acquire information related to the user or the surrounding environment. Additionally, the information processing apparatus 10 additionally may be provided with a touch panel display, physical buttons, and the like as a user interface. Also, each function of the control unit 110 according to the present embodiment may be included in another information processing apparatus connected through the communication unit 150. Also, the information processing apparatus 10 may be provided with an output unit other than the sound output unit, such as a display that outputs a display of visual information, a lamp that outputs light, or a vibration device that output vibration, and the output control unit 118 may control the output by the output unit.

3. OPERATIONS

Next, exemplary operations of the information processing apparatus 10 according to the present embodiment will be described with reference to FIG. 8.

Figure 8:
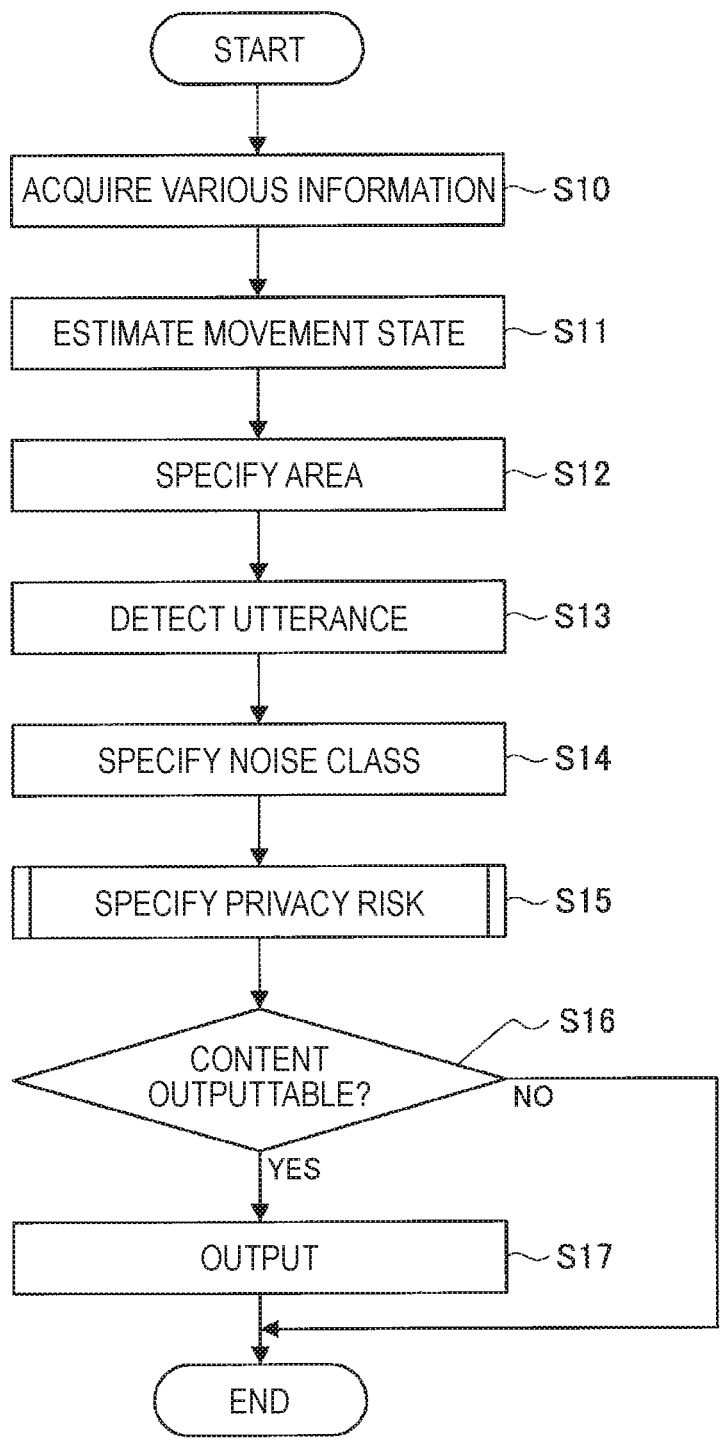
FIG. 8 is a flowchart illustrating exemplary operations of the information processing apparatus 10 according to the embodiment.

FIG. 8 is a flowchart illustrating exemplary operations of the information processing apparatus 10 according to the present embodiment. As illustrated in FIG. 8, motion information, position information, and a sound signal are acquired by the motion information acquisition unit 120, the position information acquisition unit 130, and the sound collection unit 140, respectively (S10). Next, the action recognition unit 111 estimates the movement state on the basis of the motion information (S11). Additionally, the area specification unit 112 specifies the area where the position is positioned on the basis of the position information (S12).

Next, the utterance detection by the utterance detection unit 114 and the noise class specification by the noise analysis unit 115 are executed on the basis of the speech signal and the noise signal obtained by the separation unit 113 separating the sound signal (S13, S14).

Figure 9:
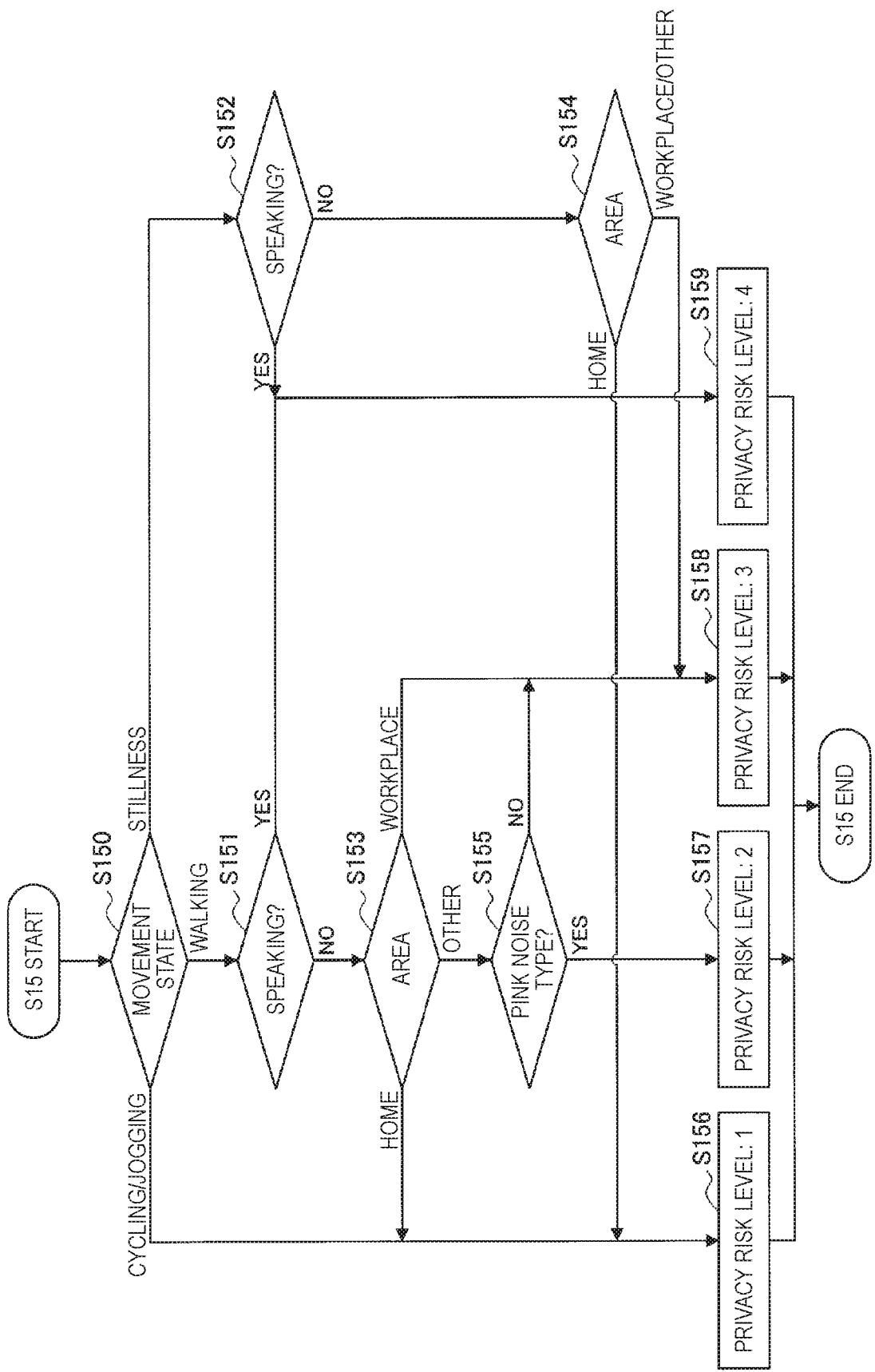
FIG. 9 is a flowchart for explaining details about a privacy risk specification process by the privacy risk specification unit 116 according to the embodiment.

Next, the privacy risk specification unit 116 specifies the privacy risk on the basis of information indicating the movement state, the area, the utterance state, and the noise class (S15). FIG. 9 is a flowchart for explaining details of the privacy risk specification process (S15) by the privacy risk specification unit 116.

As illustrated in FIG. 9, first, a determination according to the movement state is made (S150). In step S150, in the case in which the movement state is walking or stillness, a determination according to the utterance state (determining whether the user is speaking or not) is made (S151, S152).

In step S151 and step S152, in the case in which the utterance state is not-speaking (NO), a determination according to the area is made (S153, S154). In step S153, in the case in which the area is other (not the home or the workplace), a determination according to the noise class (determining whether or not the noise class is the pink noise type) is made (S155).

In step S150, in the case in which the movement state is either cycling or jogging, or in the case in which the area is the home in steps S153 and S154, a privacy risk level of 1 is specified (S156).

Also, in step S155, in the case in which the noise class is the pink noise type (YES), a privacy risk level of 2 is specified (S157).

Also, in the case in which the area is the workplace in step S153, the case in which the area is either workplace/other in step S154, or the case in which the noise class is not the pink noise type (NO) in step S155, a privacy level of 3 is specified (S158).

Also, in step S151 and step S152, in the case in which the utterance state is speaking (YES), a privacy risk level of 4 is specified (S159).

The above describes the privacy risk specification process (S15) by the privacy risk specification unit 116 in detail. Hereinafter, the description will return to FIG. 8 and proceed. Next, in step S16, the output control unit 118 determines whether or not the content is outputtable according to the privacy level of the information included in the content and the privacy risk level (S16). In the case in which the content is outputtable (YES in S16), the content is output (S17), whereas in the case in which the content is not outputtable (NO in S16), the content is not output, and the process ends.

The above describes exemplary operations of the information processing apparatus 10 according to the present embodiment. Note that the flow of processes illustrated in FIGS. 8 and 9 is one example, and the operations of the information processing apparatus 10 according to the present embodiment are not limited to such an example. For example, the processes in steps S11 to S14 may also be processed in a different order from the order illustrated in FIG. 8, or processed in parallel. In addition, the processes in steps S10 to S17 described above may also be repeated.

4. MODIFICATIONS

The above describes one embodiment of the present disclosure. Hereinafter, several modifications of one embodiment of the present disclosure will be described.

Note that each of the modifications described hereinafter may be applied to an embodiment of the present disclosure individually, or applied to an embodiment of the present disclosure in combination with each other. Also, each modification may be applied as a substitute for the configuration described in an embodiment of the present disclosure, or applied in addition to the configuration described in an embodiment of the present disclosure.

<4-1. Modification 1>

The foregoing embodiment describes an example in which the information processing apparatus 10 is provided with the sound output unit 170 to execute sound output, but the present technology is not limited to such an example. For example, the information processing apparatus 10 may be provided with an output unit other than the sound output unit, such as a display that outputs a display of visual information, a lamp that outputs light, or a vibration device that output vibration, and the output control unit 118 may control the output by the output unit.

For example, in the case in which the user's personal information included in content is displayed on the display, depending on the installation position, size, and the like of the display, personal information may be visible to persons other than the user, and therefore there is a risk that the user's privacy may be infringed through the display output similarly to the sound output. On the other hand, in the case in which a notification is output by light or vibration to indicate that content has been received or that new content exists, for example, even if the notification hypothetically is perceived by a person other than the user, it is thought that the user's personal information will not be understood, and privacy is unlikely to be infringed.

Accordingly, in the case in which the output control unit 118 is able to control the output by multiple output methods (such as sound output, display output, light output, and vibration output), the output control unit 118 may cause content-related output to be executed by an output method corresponding to the privacy risk information. In the following description, display output (for example, text display) and sound output (for example, reading aloud by speech) are assumed to be output methods for which privacy is more likely to be infringed. Also, receiving content and output notifying the user of the existence of new content by light output or vibration output are assumed to be output methods for which privacy is less likely to be infringed.

For example, in the case in which the privacy risk is high (for example, the privacy risk level is a predetermined value or greater), the output control unit 118 may cause content-related output to be executed by an output method for which privacy is less likely to be infringed. Also, in the case in which the privacy risk is low (for example, the privacy risk level is less than a predetermined value), the output control unit 118 may cause content-related output to be executed by an output method for which privacy is more likely to be infringed. Note that in the case in which the privacy risk is low, the output control unit 118 may cause output to be executed by an output method for which privacy is less likely to be infringed in addition to output by an output method for which privacy is more likely to be infringed.

According to such a configuration, in the case in which the privacy risk is high for example, the user becomes able to check the content by performing an operation or the like according to one's own judgment after having grasped that content exists, making it possible to receive the content while also keeping privacy protected.

Note that although the above describes switching the output method according to the privacy risk, similarly, the output control unit 118 may also switch the output method according to the privacy risk and the privacy level.

Also, the above cites sound output and display output as examples of output methods for which privacy is more likely to be infringed, but depending on the device involved in the output, sound output and display output may also be output methods for which privacy is less likely to be infringed. For example, sound output by closed earphones and sound output of a sound effect notifying the user of the existence of content are thought to be output methods for which privacy is less likely to be infringed. Also, display output to a small display and display output to a wearable display (for example, the display of an eyeglasses-style wearable device) are thought to be output methods for which privacy is less likely to be infringed.

<4-2. Modification 2>

Also, the foregoing embodiment describes an example in which the output control unit 118 controls content-related output, but the present technology is not limited to such an example. For example, the output control unit 118 may also control output related to the privacy risk specified by the privacy risk specification unit 116.

For example, in the case in which the privacy risk level is higher than a predetermined value, the output control unit 118 may cause a notification indicating that the privacy risk is high to be output. Also, the output control unit 118 may cause a notification indicating the current privacy risk (for example, speech reading the privacy risk level aloud) to be output. According to such a configuration, the user is able to grasp the privacy risk, and by taking an action such as moving to an environment with a low privacy risk for example, the user becomes able to actively protect one's own privacy. Also, for example, in the case in which content output control is executed according to the privacy risk level and the privacy level as described above, the user may grasp that there is a possibility of not being notified of highly private information due to a high privacy risk.

<4-3. Modification 3>

The foregoing embodiment describes an example in which the information processing apparatus 10 is a neckband-style wearable device as illustrated in FIG. 2, but the present technology is not limited to such an example. For example, the information processing apparatus 10 may also be an eyeglasses-style or watch-style wearable device or the like, and may also be a smartphone, a personal computer (PC), a robot, or the like.

Also, the apparatus that acquires information about the user's surroundings and the apparatus that outputs content may be different apparatus. In such a case, for example, the privacy risk may be specified by the apparatus that acquires information about the user's surroundings, and on the basis of information indicating the specified privacy risk, the apparatus that outputs content may execute output control.

<4-4. Modification 4>

Also, the foregoing embodiment describes an example in which the privacy risk is specified on the basis of the movement state recognized by the action recognition unit 111, but the present technology is not limited to such an example. For example, the privacy risk specification unit 116 may also specify the privacy risk on the basis of information indicating a movement speed of the user (one example of action information) obtained on the basis of the motion information. As described above, in the case in which the user's movement speed is high, there is a high probability that the relative speed between the user and persons other than the user is also high, and the probability that the output of the information processing apparatus 10 will be perceived by a person other than the user is considered to be low. For this reason, the privacy risk specification unit 116 may specify the privacy risk information such that the privacy risk becomes lower as the movement speed of the user becomes greater.

<4-5. Modification 5>

Also, the foregoing embodiment describes an example in which the information processing apparatus 10 acquires motion information, position information and a sound signal from the surroundings to specify the privacy risk, but the present technology is not limited to such an example. For example, to acquire information about the user or the user's surroundings, the information processing apparatus 10 may be provided with an additional sensor such as a biological sensor, a barometric pressure sensor, a human presence sensor, a camera, or a depth camera, and the privacy risk may be specified on the basis of information acquired from the sensor.

For example, on the basis of information acquired by a human presence sensor or a camera, it may be determined whether or not a user other than the user related to the information processing apparatus 10 is present nearby. Also, on the basis of an electromagnetic field strength related to wireless communication acquired by the communication unit 150, it may be determined whether or not a person (a person carrying a communication device) is present nearby. Also, in such a case, the privacy risk specification unit 116 may specify the privacy risk information on the basis of information indicating whether or not a present is present nearby, and specify the privacy risk information such that the privacy risk becomes higher in the case in which a person is present nearby, for example.

5. HARDWARE CONFIGURATION EXAMPLE

Figure 10:
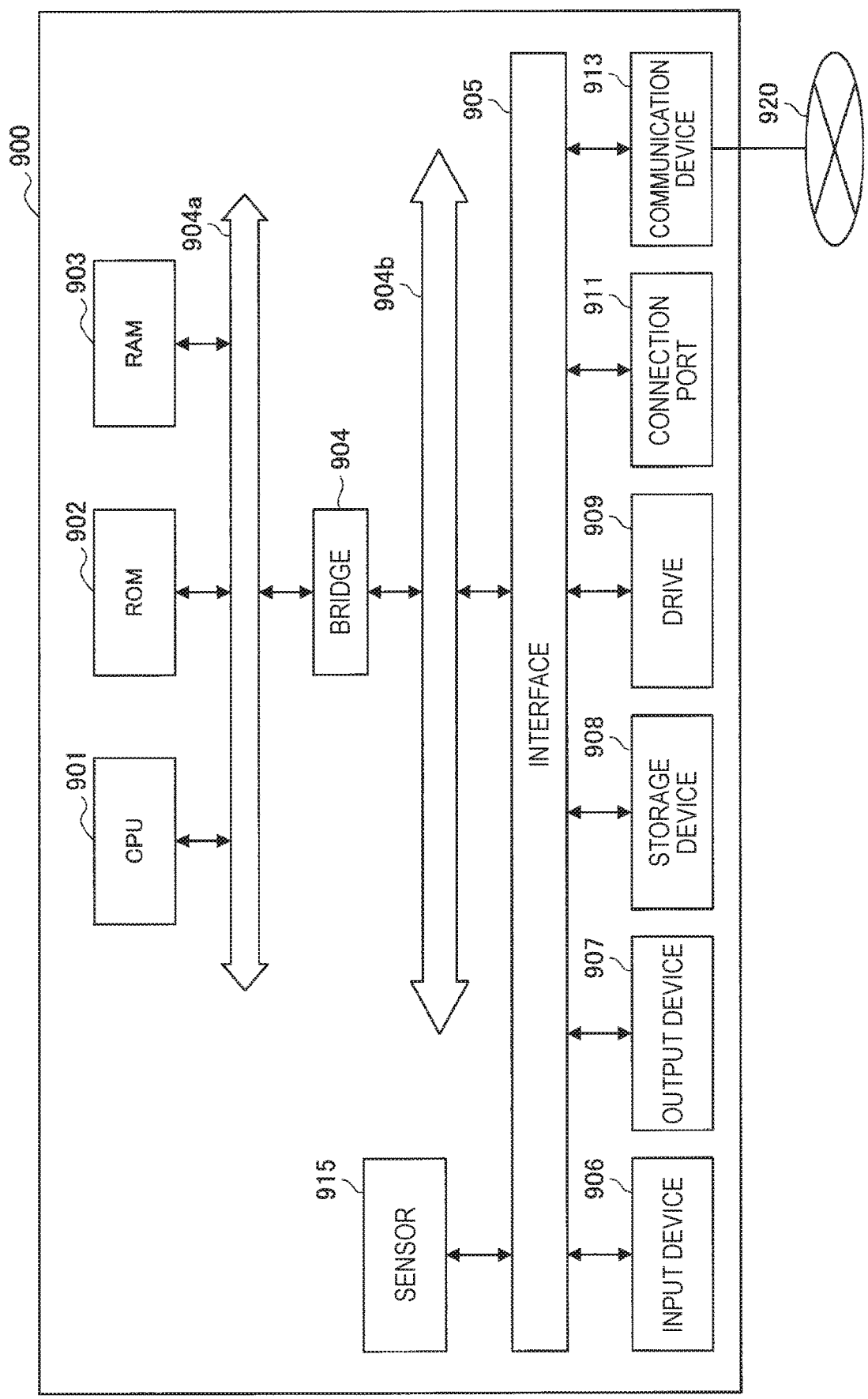
FIG. 10 is an explanatory diagram illustrating an exemplary hardware configuration.

The embodiment of the present disclosure has been described hitherto. Finally, a hardware configuration of an information processing apparatus according to the present embodiment will be described with reference to FIG. 10. FIG. 10 is a block diagram illustrating an example of the hardware configuration of the information processing apparatus according to the present embodiment. Meanwhile, an information processing apparatus 900 illustrated in FIG. 10 may realize the information processing apparatus 10 and the server 20 illustrated in FIGS. 1 and 3, for example. Information processing by the information processing apparatus 10 and the server 20 according to the present embodiment is realized according to cooperation between software and hardware described below.

As illustrated in FIG. 10, the information processing apparatus 900 includes a central processing unit (CPU) 901, a read only memory (ROM) 902, a random access memory (RAM) 903, and a host bus 904a. In addition, the information processing apparatus 900 includes a bridge 904, an external bus 904b, an interface 905, an input device 906, an output device 907, a storage device 908, a drive 909, a connection port 911, a communication device 913, and a sensor 915. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters, and the like used by the CPU 901. The RAM 903 temporarily stores programs used in execution of the CPU 901, parameters appropriately changed in the execution, and the like. The CPU 901 may form the control unit 110, for example.

The CPU 901, the ROM 902, and the RAM 903 are connected by the host bus 904*a* including a CPU bus and the like. The host bus 904*a* is connected with the external bus 904*b* such as a peripheral component interconnect/interface (PCI) bus via the bridge 904. Further, the host bus 904*a*, the bridge 904, and the external bus 904*b* are not necessarily separately configured and such functions may be mounted in a single bus.

The input device 906 is realized by a device through which a user inputs information, such as a mouse, a keyboard, a touch panel, a button, a microphone, a switch, and a lever, for example. In addition, the input device 906 may be a remote control device using infrared ray or other electric waves, or external connection equipment such as a cellular phone or a PDA corresponding to an operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

The output device 907 is formed by a device that may visually or aurally notify the user of acquired information. As such devices, there are a display device such as a CRT display device, a liquid crystal display device, a plasma display device, an EL display device, or a lamp, a sound output device such as a speaker and a headphone, a printer device, and the like. The output device 907 outputs results acquired through various processes performed by the information processing apparatus 900, for example. Specifically, the display device visually displays results acquired through various processes performed by the information processing apparatus 900 in various forms such as text, images, tables, and graphs. On the other hand, the sound output device converts audio signals including reproduced sound data, audio data, and the like into analog signals and aurally outputs the analog signals. The output device 907 may form the sound output unit 170, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device, or the like. The storage device 908 may include a storage medium, a recording device for recording data on the storage medium, a reading device for reading data from the storage medium, a deletion device for deleting data recorded on the storage medium, and the like. The storage device 908 stores programs and various types of data executed by the CPU 901, various types of data acquired from the outside, and the like. The storage device 908 may form the storage unit 160, for example.

The drive 909 is a reader/writer for storage media and is included in or externally attached to the information processing apparatus 900. The drive 909 reads information recorded on a removable storage medium such as a magnetic disc, an optical disc, a magneto-optical disc, or a semiconductor memory mounted thereon, and outputs the information to the RAM 903. In addition, the drive 909 may write information regarding the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark), or wireless USB (WUSB), for example. In addition, the communication device 913 may be a router for optical communication, a router for asymmetric digital subscriber line (ADSL), various communication modems, or the like. For example, the communication device 913 may transmit/receive signals and the like to/from the Internet and other communication apparatuses according to a predetermined protocol such as, for example, TCP/IP. The communication device 913 may for the communication unit 150, for example.

The sensor 915 corresponds to various types of sensors such as an acceleration sensor, a gyro sensor, a geomagnetic sensor, a light sensor, a sound sensor, a distance measuring sensor, and a force sensor, for example. The sensor 915 acquires information regarding a state of the information processing apparatus 900 itself, such as an attitude and a movement speed of the information processing apparatus 900, and information regarding a surrounding environment of the information processing apparatus 900, such as brightness and noise of the periphery of the information processing apparatus 900. In addition, the sensor 915 may include a GPS sensor that receives a GPS signal, and measures latitude, longitude, and altitude of the device. The sensor 915 may form, for example, the motion information acquisition unit 120.

Further, the network 920 is a wired or wireless transmission path of information transmitted from devices connected to the network 920. For example, the network 920 may include a public circuit network such as the Internet, a telephone circuit network, or a satellite communication network, various local area networks (LANs) including Ethernet (registered trademark), a wide area network (WAN), and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

6. CONCLUSION

As described above, according to an embodiment of the present disclosure, by specifying a privacy risk for a user and controlling the output of content according to the privacy risk, it is possible to reduce the infringement of user privacy.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, steps in the above-described embodiment need not be always processed in chronological order in accordance with the order described as a flowchart diagram. For example, steps in the processes in the above-described embodiment may be processed in an order different from the order described as a flowchart diagram, or may be concurrently processed.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including:
a privacy risk specification unit configured to specify privacy risk information indicating a privacy risk for a user on the basis of action information indicating an action state of the user.

(2)
The information processing apparatus according to (1), further including:
an output control unit configured to control an output on the basis of the privacy risk information.

(3)
The information processing apparatus according to (2), in which
the output control unit controls an output related to content additionally on the basis of a privacy level of information included in the content.

(4)
The information processing apparatus according to (3), in which
the output control unit controls the output related to the content in accordance with an output rule related to the privacy level according to the privacy risk information.

(5)
The information processing apparatus according to any one of (2) to (4), in which
the output control unit at least controls a sound output.

(6)
The information processing apparatus according to any one of (2) to (5), in which
the output control unit causes the output to be executed by an output method corresponding to the privacy risk information.

(7)
The information processing apparatus according to (6), in which
the output control unit causes the output to be executed by one output method from among sound output and vibration output according to the privacy risk information.

(8)
The information processing apparatus according to any one of (1) to (7), in which
the action information includes movement information indicating a movement state of the user.

(9)
The information processing apparatus according to (8), in which
the privacy risk specification unit specifies the privacy risk information such that the privacy risk becomes lower as the movement information indicates a movement state with a greater movement speed.

(10)
The information processing apparatus according to any one of (1) to (9), in which
the action information includes information indicating an utterance state of the user.

(11)
The information processing apparatus according to (10), in which
the privacy risk specification unit specifies the privacy risk information such that the privacy risk in a case of a speaking utterance state becomes higher than in a case of a not-speaking utterance state.

(12)
The information processing apparatus according to any one of (1) to (11), in which
the action information includes information indicating a movement speed of the user.

(13)
The information processing apparatus according to (12), in which
the privacy risk specification unit specifies the privacy risk information such that the privacy risk becomes lower as the movement speed becomes greater.

(14)
The information processing apparatus according to any one of (1) to (13), in which
the privacy risk specification unit specifies the privacy risk information additionally on the basis of environment information related to an environment surrounding the user.

(15)
The information processing apparatus according to (14), in which
the environment information includes area information indicating an area where the user is positioned.

(16)
The information processing apparatus according to (14) or (15), in which
the environment information includes information related to a noise surrounding the user.

(17)
The information processing apparatus according to (16), in which
the information related to the noise includes information indicating a class of the noise.

(18)
The information processing apparatus according to any one of (1) to (17), in which the privacy risk specification unit specifies the privacy risk information additionally on the basis of information indicating whether or not a person is present nearby.

(19)
An information processing method, executed by a processor, including:

specifying privacy risk information indicating a privacy risk for a user on the basis of action information indicating an action state of the user.

(20) A program causing a computer to realize:

a function of specifying privacy risk information indicating a privacy risk for a user on the basis of action information indicating an action state of the user.

REFERENCE SIGNS LIST 1 information processing system
5 communication network
10 information processing apparatus
20 server
110 control unit
111 action recognition unit
112 area specification unit
113 separation unit
114 utterance detection unit
115 noise analysis unit
116 privacy risk specification unit
117 communication control unit
118 output control unit
120 motion information acquisition unit
130 position information acquisition unit
140 sound collection unit
150 communication unit
160 storage unit
170 sound output unit

The invention claimed is:

1. An information processing apparatus, comprising:
a microphone configured to collect a sound signal of an environment that surrounds a user; and
a central processing unit (CPU) configured to:
separate, based on a direction of the sound signal, the sound signal into a speech signal of the user and a noise signal associated with noise that surrounds the user;
detect an utterance state of the user based on the speech signal of the user, wherein the utterance state is one of a speaking utterance state in which speech is uttered by the user or a not-speaking utterance state in which the speech is not uttered by the user;
specify a class of the noise based on a comparison of average power value for each frequency of the noise signal with a threshold power; and
specify privacy risk information for the user based on the utterance state of the user and the class of the noise, wherein the privacy risk information indicates a privacy risk for the user.

2. The information processing apparatus according to claim 1, wherein the CPU is further configured to control an output based on the privacy risk information.

3. The information processing apparatus according to claim 2, wherein the CPU is further configured to control the output related to content based on a privacy level of information included in the content.

4. The information processing apparatus according to claim 3, wherein
the privacy risk information includes the privacy level, and
the CPU is further configured to control the output related to the content based on an output rule related to the privacy level.

5. The information processing apparatus according to claim 2, wherein the CPU is further configured to control at least a sound output.

6. The information processing apparatus according to claim 2, wherein the CPU is further configured to control an execution of the output based on an output method corresponding to the privacy risk information.

7. The information processing apparatus according to claim 6, wherein the output method includes one of sound output or vibration output.

8. The information processing apparatus according to claim 1, wherein the CPU is further configured to specify the privacy risk information based on movement information indicating a movement state of the user.

9. The information processing apparatus according to claim 8, wherein the privacy risk for the user is low for the movement state that has a high movement speed.

10. The information processing apparatus according to claim 1, wherein the privacy risk for the user in the speaking utterance state is higher than the privacy risk for the user in the not-speaking utterance state.

11. The information processing apparatus according to claim 1, wherein the CPU is further configured to specify the privacy risk information based on information indicating a movement speed of the user.

12. The information processing apparatus according to claim 11, wherein the privacy risk for the user decreases as the movement speed of the user increases.

13. The information processing apparatus according to claim 1, wherein the CPU is further configured to specify the privacy risk information based on area information indicating an area where the user is positioned.

14. The information processing apparatus according to claim 1, wherein the CPU is further configured to specify the privacy risk information based on information that indicates one of a presence or absence of a person in a specific proximity to the user.

15. An information processing method, comprising:
collecting, by a microphone, a sound signal of an environment that surrounds a user:
separating, by a processor, based on a direction of the sound signal, the sound signal into a speech signal of the user and a noise signal associated with noise that surrounds the user;
detecting, by the processor, an utterance state of the user based on the speech signal of the user, wherein the utterance state is one of a speaking utterance state in which speech is uttered by the user or a not-speaking utterance state in which the speech is not uttered by the user;
specifying, by the processor, a class of the noise based on a comparison of average power value for each frequency of the noise signal with a threshold power; and
specifying, by the processor, privacy risk information for the user based on the utterance state of the user and the class of the noise, wherein the privacy risk information indicates a privacy risk for the user.

16. A non-transitory computer-readable medium having stored thereon, computer-executable instructions which, when executed by a processor, cause the processor to execute operations, the operations comprising:
collecting a sound signal of an environment that surrounds a user;
separating, based on a direction of the sound signal, the sound signal into a speech signal of the user and a noise signal associated with noise that surrounds the user;

detecting an utterance state of the user based on the speech signal of the user, wherein the utterance state is one of a speaking utterance state in which speech is uttered by the user or a not-speaking utterance state in which the speech is not uttered by the user;

specifying a class of the noise based on a comparison of average power value for each frequency of the noise signal with a threshold power; and specifying privacy risk information for the user based on the utterance state of the user and the class of the noise, wherein the privacy risk information indicates a privacy risk for the user.

* * * * *